(12) United States Patent
Bondurant

(10) Patent No.: US 7,493,494 B2
(45) Date of Patent: Feb. 17, 2009

(54) SECURE DATA CARTRIDGE

(75) Inventor: Matthew D. Bondurant, Superior, CO (US)

(73) Assignee: ProStor Systems, Inc., Boulder, CO (US)

( * ) Notice: Subject to any disclaimer, the term of this patent is extended or adjusted under 35 U.S.C. 154(b) by 461 days.

(21) Appl. No.: 11/266,806

(22) Filed: Nov. 3, 2005

(65) Prior Publication Data

US 2007/0101442 A1    May 3, 2007

(51) Int. Cl.
*G06F 21/00* (2006.01)

(52) U.S. Cl. ................................................ 713/184
(58) Field of Classification Search ............. 713/184; 726/27

See application file for complete search history.

(56) References Cited

U.S. PATENT DOCUMENTS

2003/0188162 A1* 10/2003 Candelore et al. .......... 713/169
2005/0138392 A1* 6/2005 Johnson et al. ............. 713/186

* cited by examiner

*Primary Examiner*—Kambiz Zand
*Assistant Examiner*—Andrew L Nalven
(74) *Attorney, Agent, or Firm*—Townsend and Townsend and Crew LLP

(57) ABSTRACT

According to the invention, an authorization system for authorizing access to a data cartridge is disclosed. The authorization system includes a code, a data cartridge interface, a fingerprint processor, a password generator, and an authorization engine. The code is obtained from outside the data cartridge. The data cartridge interface is used to read data from the data cartridge, where the data includes first information and a fingerprint. The fingerprint generator generates second information using at least the code. The password generator unlocks the data cartridge using the code and the data. The authorizing engine is coupled to at least one of the password generator or the fingerprint processor. At least some of the data or the second information is compared to authorize the data cartridge.

39 Claims, 17 Drawing Sheets

SECURE DATA CARTRIDGE

BACKGROUND OF THE DISCLOSURE

This disclosure relates in general to removable data cartridges and, more specifically, but not by way of limitation, to protecting removable data cartridges.

Digital media today has varying levels of quality. Inferior quality is especially an issue where counterfeiting of digital media is prevalent. A consumer who receives a counterfeit media may believe the authentic media are of inferior quality. Counterfeit media can damage the drive used to read the media. Drive makers would have increased warranty repairs should substandard media be used in the market.

Hacking is a substantial risk for all computer components today. This is especially true for storage media. Reverse engineering operation of a storage media may allow eavesdropping or other unauthorized uses. Hard drives have password protection to prevent improper use by unauthorized persons. DVD disks use a common key that is used for all drives, but discovery of that key has made hacking and duplication possible.

BRIEF DESCRIPTION OF THE DRAWINGS

The present disclosure is described in conjunction with the appended figures.

Figure 1A:
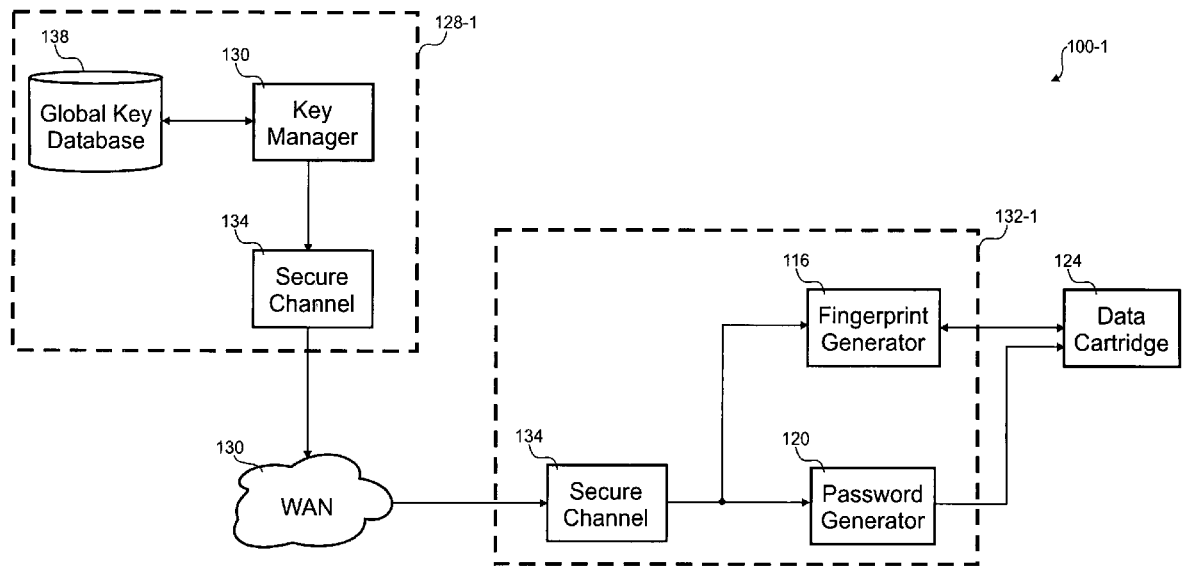
FIGS. 1A 1B, 1C and 1D are block diagrams of embodiments of a cartridge security system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment, the present disclosure provides an authorization system for authorizing access to a data cartridge. The authorization system includes a code, a data cartridge interface, a fingerprint processor, a password generator, and an authorization engine. The code is obtained from outside the data cartridge. The data cartridge interface is used to read data from the data cartridge, where the data includes first information and a fingerprint. The fingerprint generator generates second information using at least the code. The password generator unlocks the data cartridge using the code and the data. The authorizing engine is coupled to at least one of the password generator or the fingerprint processor. At least some of the data or the second information is compared to authorize the data cartridge.

With reference to FIG. 1A, a block diagram of an embodiment of a cartridge security system 100-1 is shown that is interfaced with a data cartridge 124. The cartridge security system 100 secures data cartridges 124 such that authentication is required for use of the data cartridge 124. Although the figure only shows a single data cartridge 124, it is understood that the cartridge security system 100 would program many data cartridges 124 before releasing them in the stream of commerce. They could be programmed serially or in parallel, depending on the manufacturing configuration. This embodiment 100-1 includes an authorizing system 128-1 and a cartridge programmer 132 shown coupled to a data cartridge 124.

The data cartridge 124 is a self contained storage medium that can be plugged into systems to store information and is not part of the cartridge security system 100. A password authentication feature of the data cartridge can be activated to require a password before reading or writing data to the cartridge 124. In this embodiment, the data cartridge includes a 2.5" hard disk drive (HDD) for storage, but other embodiments could use flash memory, optical disk drives, magnetic tape, holographic media, or other sized hard drives. The HDD could communicate with the cartridge programmer 132 with a SATA, PATA, SAS, SCSI, USB, Ethernet, BlueTooth, Zigbee, WiFi and/or any other wired or wireless communication protocol. Each data cartridge 124 has an electronically-accessible serial number and/or other unique information that can be used in the authentication process. The other unique information could include a sector defect list of the data cartridge, a model number of the data cartridge, a manufacturer identifier of the data cartridge, a manufacturer date code, a RFID-read code of the data cartridge, and/or head optimization information of the data cartridge. Embodiments could use any unique information electronically readable from the storage medium that is impractical to modify or would render the HDD inoperable if modified.

The authorizing system 128-1 manages the security for the cartridge security system 100. In this embodiment, a key is created for each data cartridge 124. Communication with the cartridge programmer 132 allows recording each key uniquely for a data cartridge 124. Unique information from the data cartridge 124 minimizes the risk that a key is used twice. Where duplicate information is received, an error is reported to the cartridge programmer 132. Included in the authorizing system 128 are a global key database 138, a key manager 130 and a secure channel 134. In some embodiments, data on the data cartridge 124 can be encrypted with the key for the data cartridge 124, while other embodiments do not encrypt the information on the data cartridge.

The secure channel 134 allows communicating with the one or more cartridge programmers through a wide area network (WAN) 130 that may not be totally secure. A virtual private network VPN and/or encryption could be used by the secure channel to communicate with the cartridge programmer 132. A leased line, private network, public network, and/or the Internet could be used for the WAN 130. The secure channel 134 protects the keys and key algorithm from interception and/or hacking in transport to the cartridge programmer 132, who is typically remotely located.

The key manager 130 generates keys for each of the data cartridges 124. The key and unique identification for the data cartridge 124 is stored in the global key database 138. Whenever the data cartridge is encountered, the authorizing system 128-1 can be queried for the key after the unique identification is produced. Any device requesting key information is authenticated also to be sure that keys aren't handed out to unauthorized sources. In this embodiment, private keying is used, but other embodiments use public keying. In this embodiment, each data cartridge 124 has its own key, but other embodiments could have a group of data cartridges 124 that share a key. Counterfeit or hacked devices and data cartridges 124 can be removed from the global key database 138 to prevent further use as data cartridges 124 without keys are not usable by cartridge drives.

The cartridge programmer 132 enables data cartridges 124 for use by the cartridge security system 100-1. Included in this embodiment of the cartridge programmer 132 are the secure channel 134, the fingerprint generator 116 and the password generator 120. Often, the cartridge programmer 132 is also the manufacturer of the data cartridge 124. Although not shown, there can be any number of cartridge programmers 132 in the cartridge security system 100.

Once information from the data cartridge 124 is reported by the cartridge programmer to the authorizing system 128, the key is reported back to the cartridge programmer 132. The key is used by the fingerprint generator 116 to generate information written to the data cartridge 124. As will be explained below, the fingerprint written to the data cartridge is checked to authenticate the data cartridge 124. The key is also used in formulating a password for the data cartridge 124, where the password locks access to the data on the data cartridge 124.

Although this embodiment has a key for each data cartridge 124, other embodiments could have a keys used for more than one data cartridge. Grouping of the data cartridges 124 could be by serial number range, manufacturer, model, lot date, size, number of defects, number of heads, and/or any other category. All the data cartridges 124 in a particular group could share a key. The keys are stored in the global key database 138 and accessible to cartridge programmers 132 and cartridge drives 204 as needed over the secure channel 134.

Figure 1B:
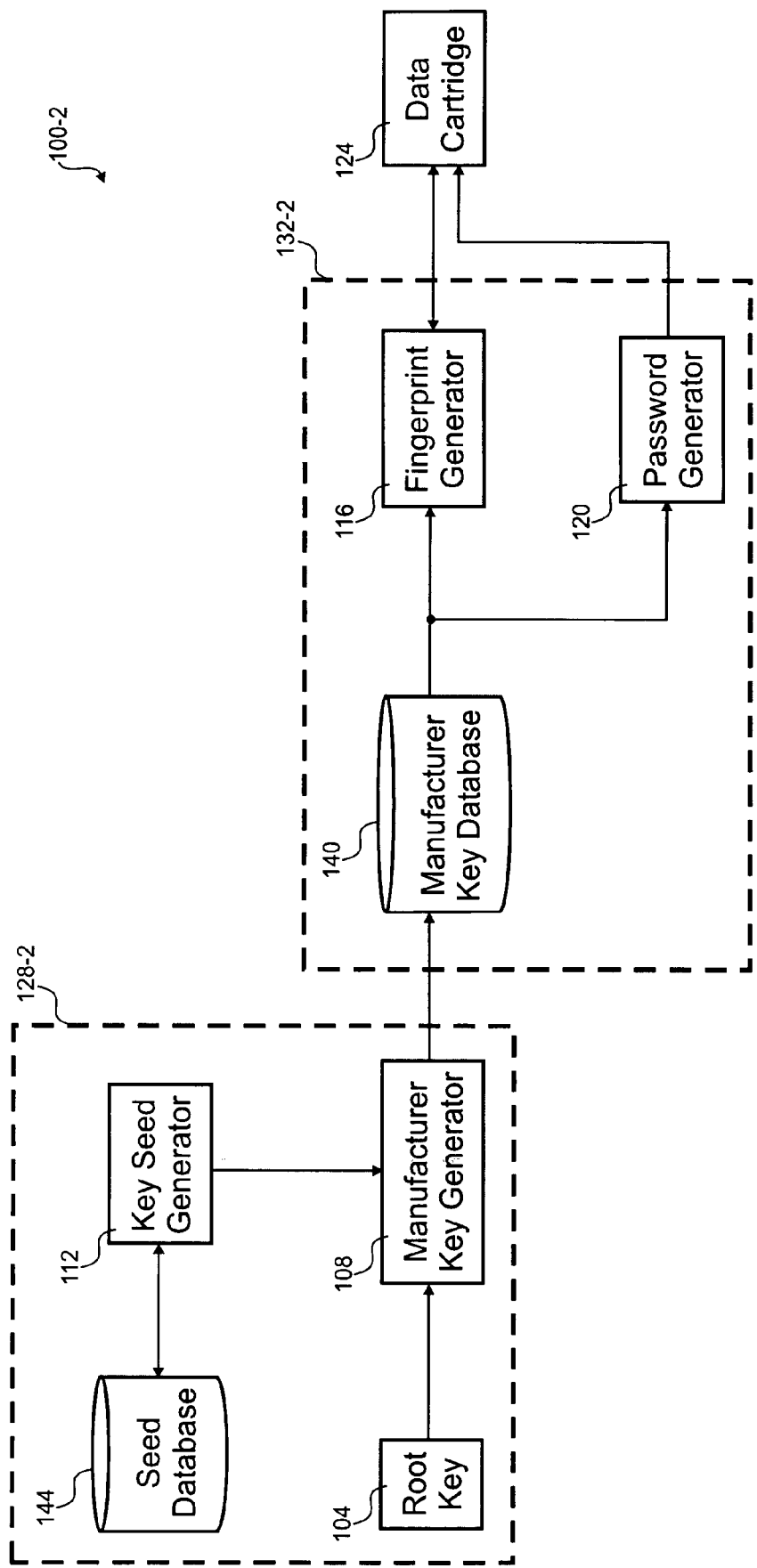

Referring next to FIG. 1B, a block diagram of another embodiment of a cartridge security system 100-2 is shown coupled to a separate data cartridge 124. In this embodiment, a set of keys is made for each cartridge programmer 132. The keys are a function of information specific to a particular data cartridge or a class of data cartridges 124 and a function of a root key of the authorizing system 128-2. This embodiment has a key used for a group of data cartridges 124. Whenever new groups are formed, the cartridge programmer 132 requests a new key for use with the group.

The authorizing system 128 includes a root key 104, a manufacturer key generator 108, a key seed generator 112 and a seed database 144. The seed database 144 stores the various seeds that are used for the various groups of data cartridges 124. The seed could be any information related to the cartridge HDD, for example, serial number range, manufacturer, model number, lot date, size, number of defects, sector defect map data, number of heads, and/or any other category. Table I shows an example of where the seed is a function of drive model and manufacture month and Tables II and III show examples of where the manufacturer and model number is correlated to the seed. The seeds in Tables I and II are scrambled according to a known algorithm, whereas the seeds in Table III are intelligible.

TABLE I

Seed Generation Examples

| Drive Model | Manufacture Date | Seed |
|---|---|---|
| CNC120GB | July-05 | 234AB7890F |
| | June-05 | F2783GE90A |
| | May-05 | 324G32E909 |
| | April-05 | E89D898AE |
| HST80G | July-05 | 67E2399898 |
| | June-05 | 0982GGA89 |
| | May-05 | A7621G90E |

TABLE II

Seed Generation Examples

| Manufacturer | Model | Seed |
|---|---|---|
| AMCE | CNC120GB | 234AB7890F |
|  | CNC60GB | F2783GE90A |
| ABC Co. | HST120G | 67E2399898 |
|  | HST100G | 0982GGA89 |
|  | HST80G | A7621G90E |

TABLE III

Seed Generation Examples

| Manufacturer | Model | Seed |
|---|---|---|
| AMCE | CNC120GB | ACME120B |
|  | CNC60GB | ACME060C |
| ABC Co. | HST120G | ABC120A |
|  | HST100G | ABC100B |
|  | HST80G | ABC080F |

From the seed database 144, the key seed generator produces a manufacturer seed, using some sort of cryptographic algorithm. Any cryptographic algorithm could be used, for example, AES, DES, triple-DES, SHA-1, SHA-256, SHA-512, MD4, MD5, HMAC, etc. The key seed is sent the manufacturer key generator 108 along with the root key 104 to produce a manufacturer key for that class of data cartridges 124. The manufacturer key is passed to the cartridge programmer 132. The manufacturer key generator 108 produces the manufacturer key using the key seed for a particular group of data cartridges 124 along with the root key 104 using a standard cryptographic algorithm, for example, AES, DES, triple-DES, SHA-1, SHA-256, SHA-512, MD4, MD5, HMAC, or a proprietary algorithm. The root key may change at particular times, but if not communicated to the cartridge drives, new data cartridges 124 programmed with the new root key 104 cannot be authenticated for use.

The cartridge programmer 132 includes a manufacturer key database 140, a fingerprint generator 116, and a password generator 120. The manufacturer key database 140 stores all the manufacturer keys requested for this particular cartridge programmer 132. If a manufacturing key is not found in the manufacturer key database 140, it is requested from the authorizing system 128. This embodiment has a direct connection between the cartridge programmer 132 and the authorizing system 128, but other embodiments could use a WAN of some sort. As in the previous embodiments, the fingerprint generator 116 generates the fingerprint written to the data cartridge 124 and the password generator 120 password protects the data cartridge 124.

Figure 1C:
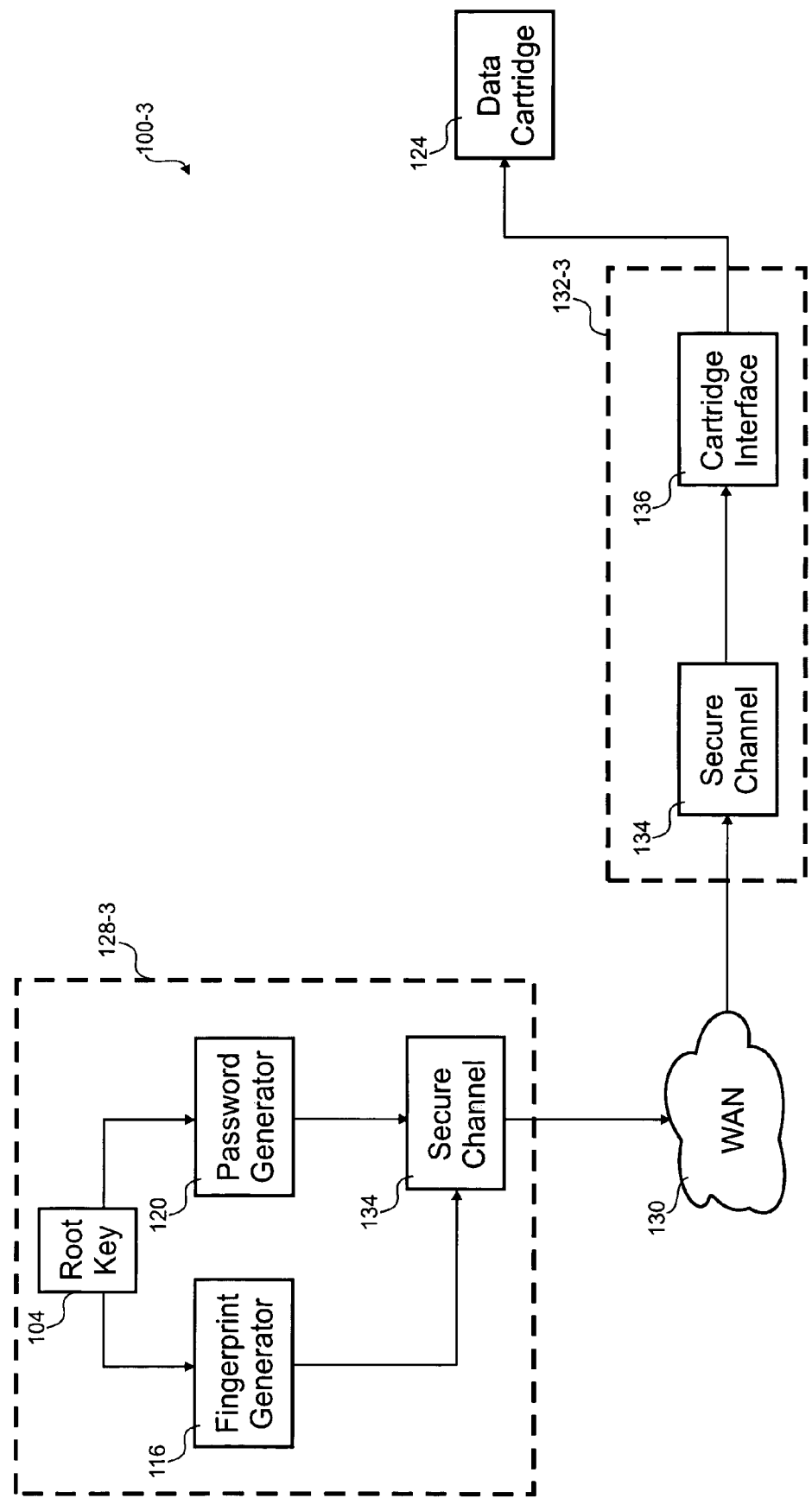

With reference to FIG. 1C, a block diagram of yet another embodiment of a cartridge security system 100-3 is shown coupled to a data cartridge 124. This embodiment includes the fingerprint generator 116 and password generator 120 in the authorizing system 128-3. The root key can be the only key used to generate fingerprints and passwords. A cartridge interface 136 in the cartridge programmer 132-3 interacts with the data cartridge 124 to gather information to use in remotely generating the password and fingerprint. When the data cartridge 124 is later recognized by a data cartridge drive, communication back to the authorizing system 128-4 allows unlocking the data cartridge 124 for use.

Figure 1D:
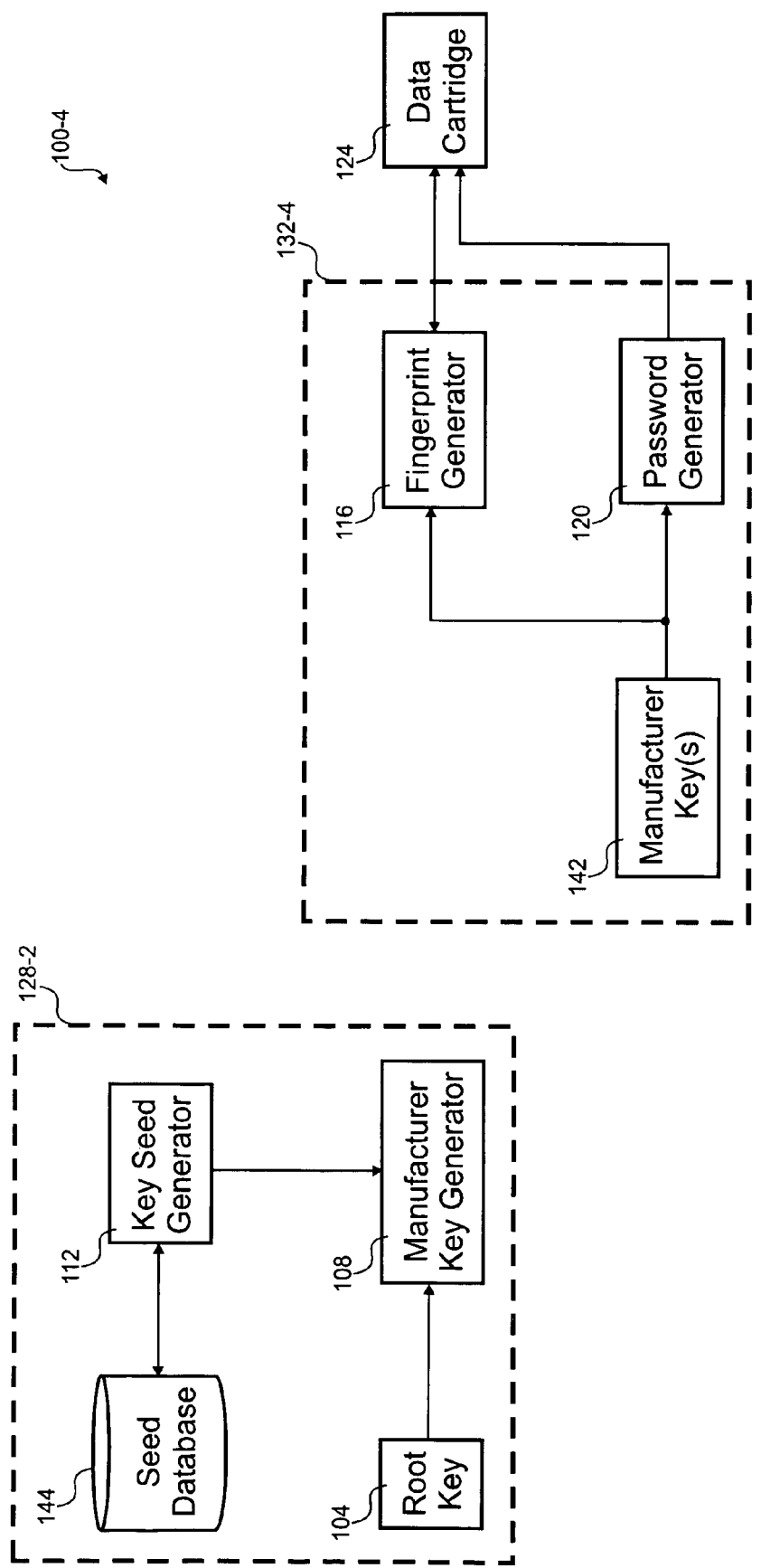

Referring next to FIG. 1D, a block diagram of still another embodiment of a cartridge security system 100-4 is shown coupled to a data cartridge 124. In this embodiment, the manufacturer key(s) 142 is securely stored in the cartridge programmer 132-4. The manufacturer key(s) are generated by the authorizing system 128-2 and manually loaded when the cartridge programmer 132 is produced or at a later time when the cartridge programmer 132 is in the field. Although this embodiment has a two-level key system, a single-level key system could be used where all cartridge programmers 132-4 hold the root key securely.

Figure 2A:
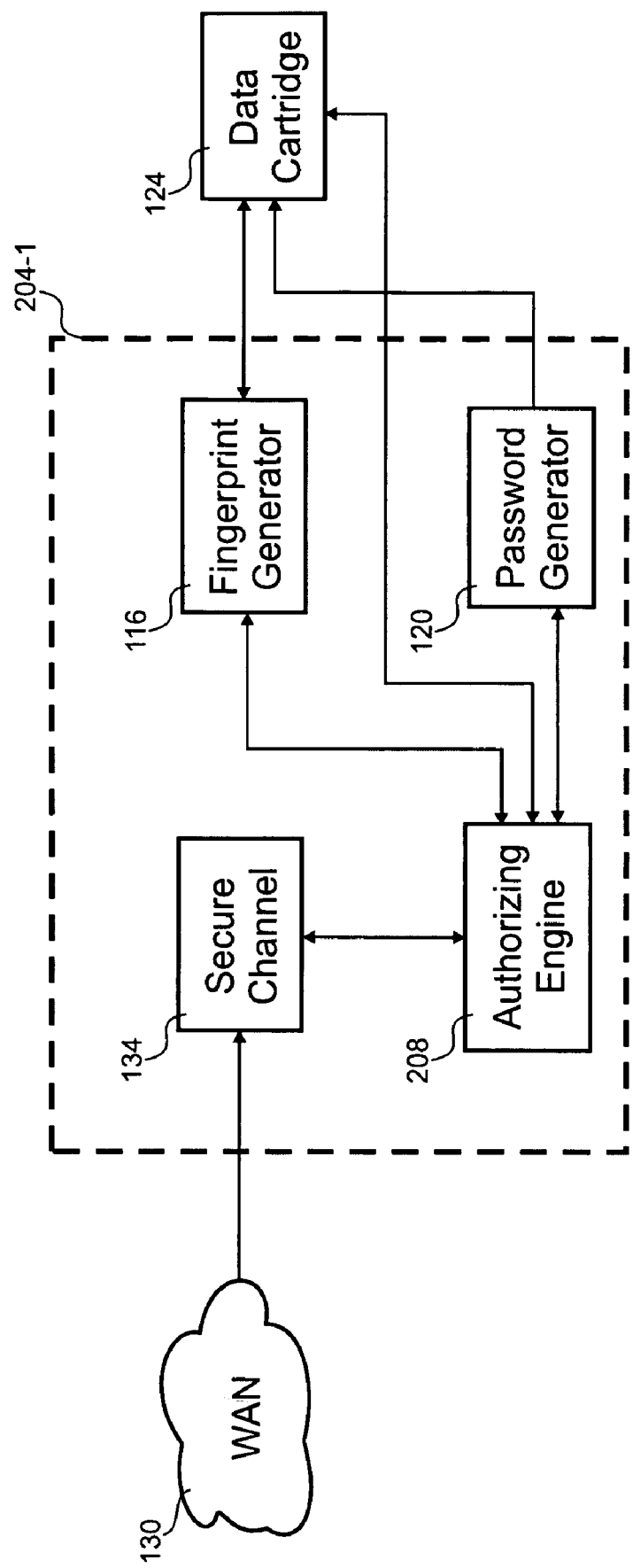
FIGS. 2A, 2B, 2C, 2D, and 2E are block diagrams of embodiments of a data cartridge drive.

With reference to FIG. 2A, a block diagram of an embodiment of a data cartridge drive 204-1 is shown interfaced to a WAN 130 and a data cartridge 124. This embodiment requests a key for a particular data cartridge 124 once encountered, but other embodiments could store keys to avoid a request in some circumstances. Information is read from the data cartridge 124 by an authorizing engine 208 and passed over the secure channel 134 using the WAN 130 to the authorizing system 128-1. Once the authorizing engine 208 receives the key from the authorizing system 128-1, the key is passed to the fingerprint generator 116 and password generator 120 to allow unlocking the data cartridge for use. In other embodiments, the key is also used to cryptographically encode the information stored on the data cartridge.

Figure 2B:
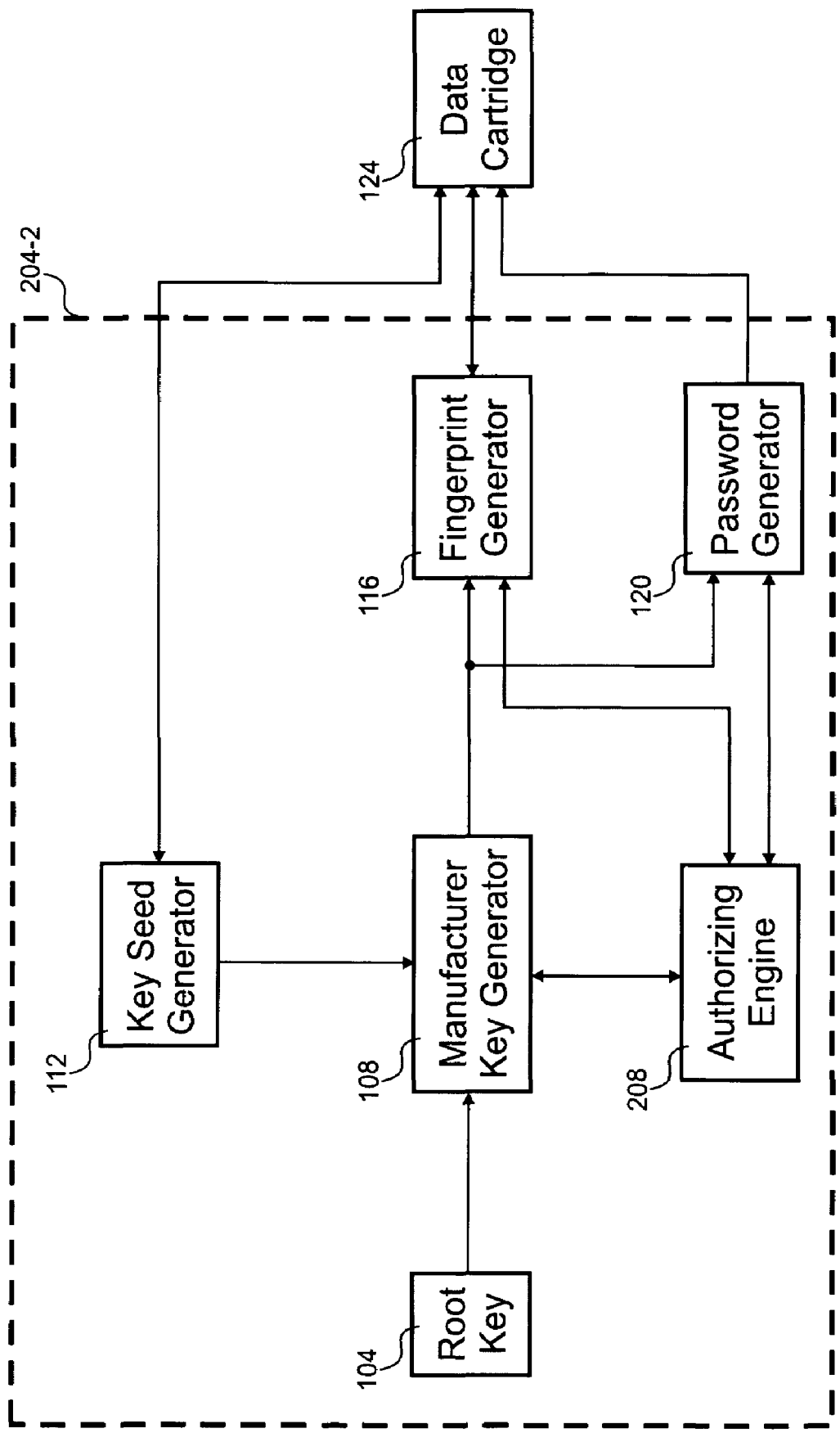

Referring next to FIG. 2B, a block diagram of another embodiment of the data cartridge drive 204-2 is shown interfaced to the data cartridge 124. This embodiment works with the embodiment of the cartridge security system 100-1 of FIG. 1B. The cartridge drive 204-2 holds the root key 104, which is a copy of the root key 104 stored in the authorizing system 128-2. Using the root key 104, information gathered from a particular data cartridge 124 is used by the key seed generator 112 to produce a key seed for the manufacturer key generator 108. The key for the data cartridge 124 is generated and passed to the authorizing engine 208 to unlock the data cartridge 124.

The root key could be hard coded into an encryption engine or secure processor such that uncovering the root key is unlikely. The population of cartridge drives could have different root keys. For example, each manufacturer could have a different root key. In this configuration, only data cartridges 124 programmed with a particular root key could work with a cartridge drive that used that root key.

Although the root key is stored in the data cartridge drive 204-2 in this embodiment, other embodiments allow updating the root key or adding new keys. The root key could be stored on a card to allow updating or could be in a firmware update. Some embodiments allow adding new root keys for new data cartridges to allow use with newer data cartridges using a different root key.

Figure 2C:
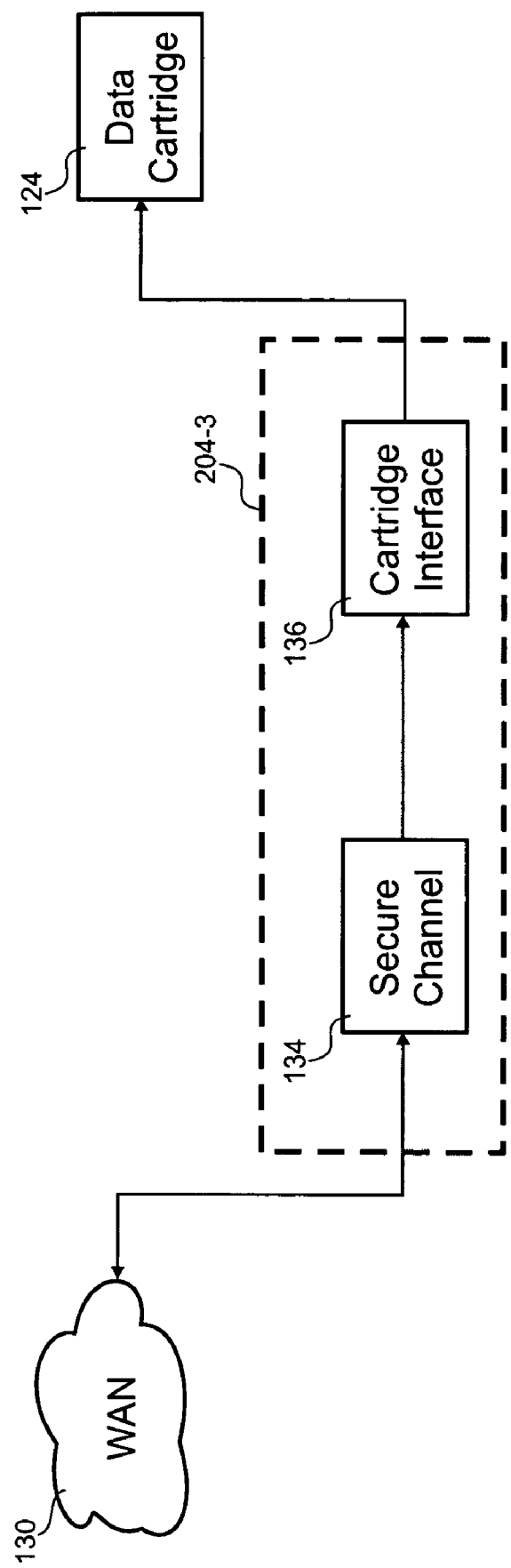

Referring next to FIG. 2C, a block diagram of still another embodiment of the data cartridge drive 204-3 is shown interfaced to a WAN 130 and a data cartridge 124. This embodiment relies upon the authorizing system 128 to interact with the data cartridge to unlock the data cartridge 124 and check the fingerprint. The WAN 130 allows the real-time interaction with the data cartridge 124.

Figure 2D:
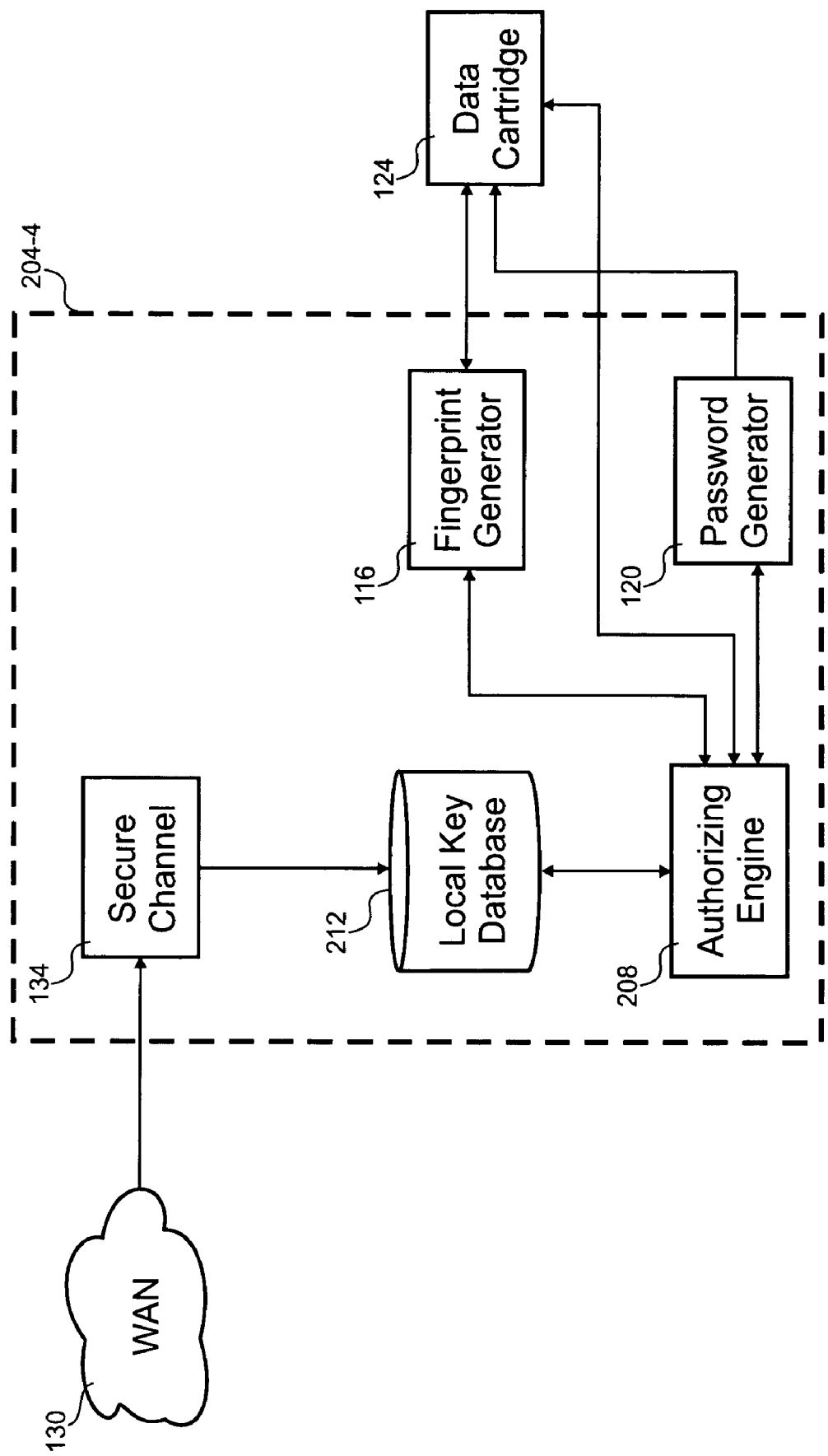

With reference to FIG. 2D, a block diagram of another embodiment of a data cartridge drive 204-4 is shown interfaced to a WAN 130 and a data cartridge 124. This embodiment stores keys for each data cartridge or for groups of data cartridges. Updates to the stored keys can be performed each time a new data cartridge 124 is encountered or periodically as new keys are issued. In this embodiment, keys are stored in a local key database 212 for groups of data cartridges 124. Periodically, the secure channel 134 uses the WAN 130 to gather any new keys from the authorizing system 128-1. Should a data cartridge 124 be encountered where the local key database 212 doesn't have a key, a query can be made to the authorizing system 128-1 to gather the key. Once the key is available, the authorizing engine 208 can unlock the data cartridge 124 using the fingerprint generator 116 and password generator 120.

Figure 2E:
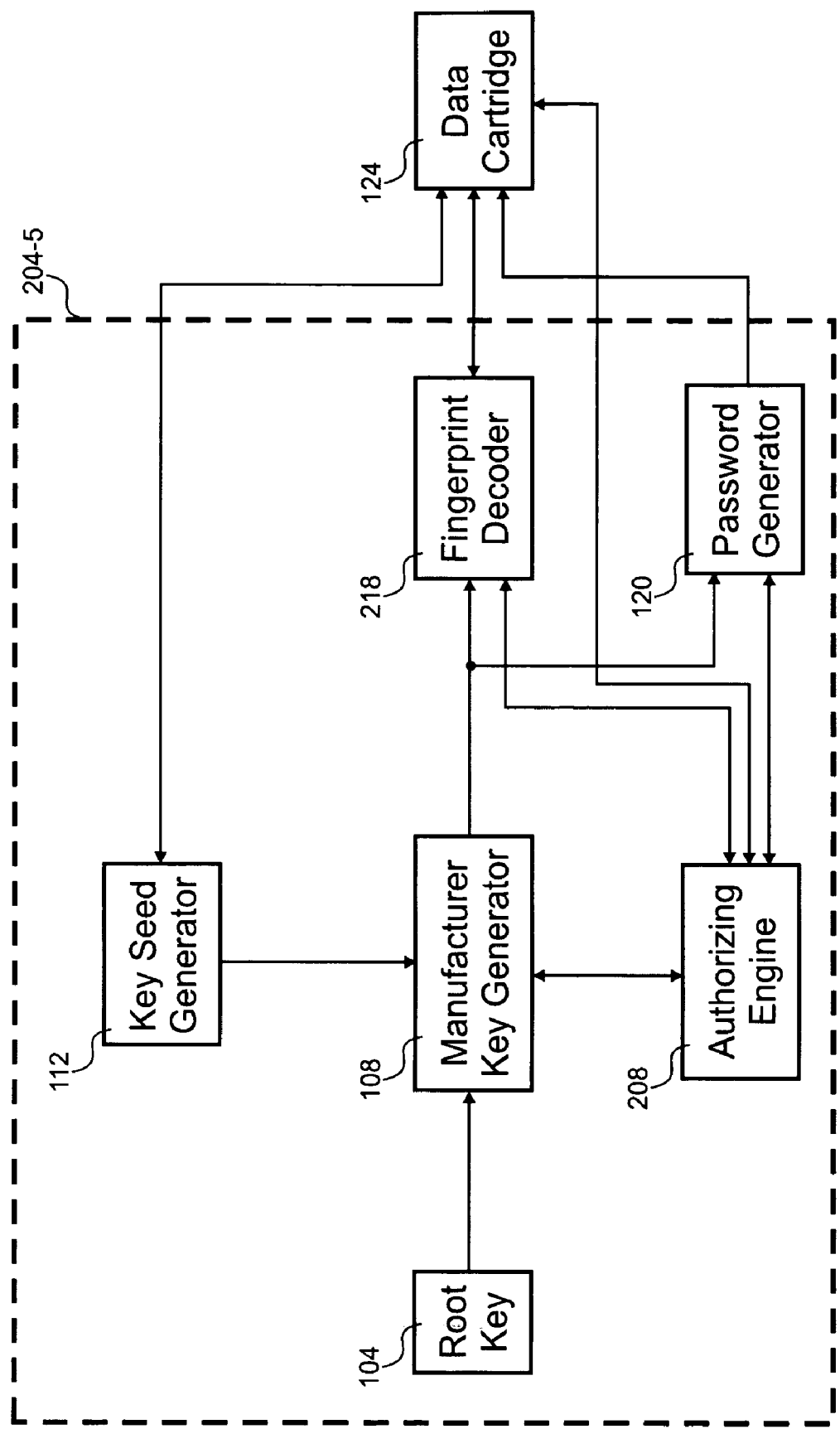

Referring next to FIG. 2E, a block diagram of another embodiment of a data cartridge drive 204-5 is shown interfaced to a data cartridge 124. In this embodiment, the root key 104 is stored in the data cartridge drive 204-5 and can be used to generate manufacturer keys as needed. Other embodiments could download the manufacturer keys instead. Prior to use, the cartridge programmer 132 writes an encrypted fingerprint to the data cartridge 124 using the relevant manufacturer key. To check the fingerprint, the fingerprint decoder decrypts the fingerprint stored on the data cartridge 124 with the manufacturer key. Decryption reveals unique information that can be read from the data cartridge to compare them. For example, the decryption can reveal the data cartridge serial number that can be read from the data cartridge 124 and compared by the authorizing engine 208.

Figure 3A:
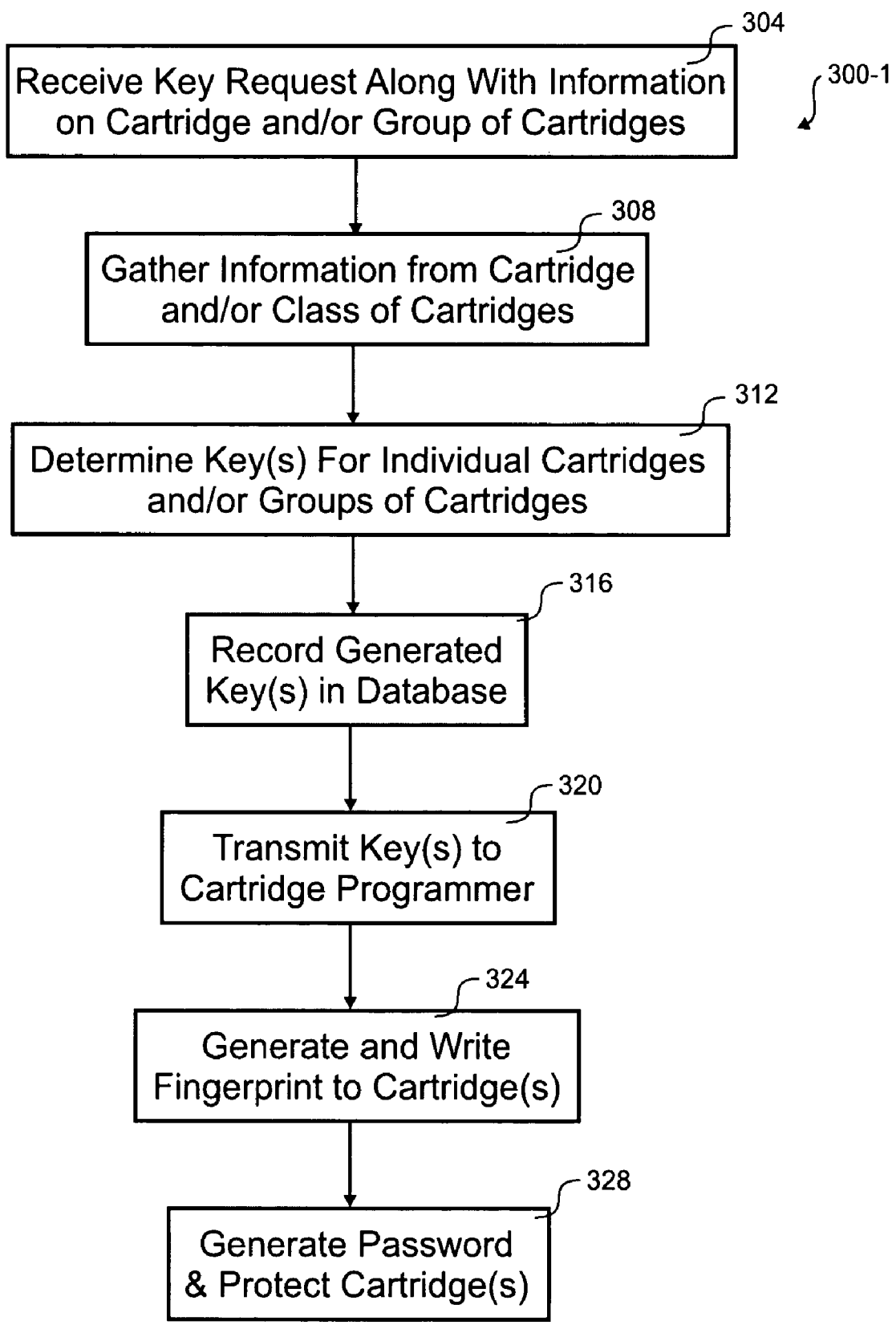
FIGS. 3A and 3B are flow diagrams of embodiments of a process for securing data cartridges.

With reference to FIG. 3A, a flow diagram of an embodiment of a process 300-1 for securing data cartridges 124 is shown. The depicted portion of the process begins in step 304 where a key request is received by the authorizing system 128 from the cartridge programmer 132. The key request could be for a single data cartridge or a group of data cartridges 124. The authorizing system 128 gathers information on the data cartridges or class of data cartridges in step 308. The information may be presented by the cartridge programmer 132 as part of the key request in some embodiments.

In step 312, the key(s) is determined. There are many different ways to determine the key in various embodiments. Generally, the key is a function of the information unique to the data cartridge or group of data cartridges 124. The key manager 130 produces the key(s) in this embodiment. In step 316, the key is recorded in the global key database 138. Using a secured channel 134 over a WAN or a secure connection, the key(s) is transmitted to the cartridge programmer 132.

This embodiment only has a single key for a particular data cartridge, but other embodiments could have multiple keys that are used under different circumstances. For example, a first key might be used for a first time period and a second key used for a second time period.

Once the cartridge programmer 132 receives the key(s) in step 320, the cartridge(s) can be enabled for use. In this embodiment, at least two steps are performed to prepare a data cartridge for use. A fingerprint is generated with the key and written to the data cartridge in step 324. Since the key is affected by information relating to the data cartridge, the fingerprint will also vary with the information. In this embodiment, the fingerprint is a multi-level hash of information from the data cartridge that uses the key.

A password is generated using the key in step 328. The password is applied to the data cartridge such that subsequent use of the data requires knowing the password. In this embodiment, the data cartridge includes a hard drive that has password protection. The password is a function of drive information and the key. For example, the key could be used to encrypt the hard drive serial number to generate the password.

Figure 3B:
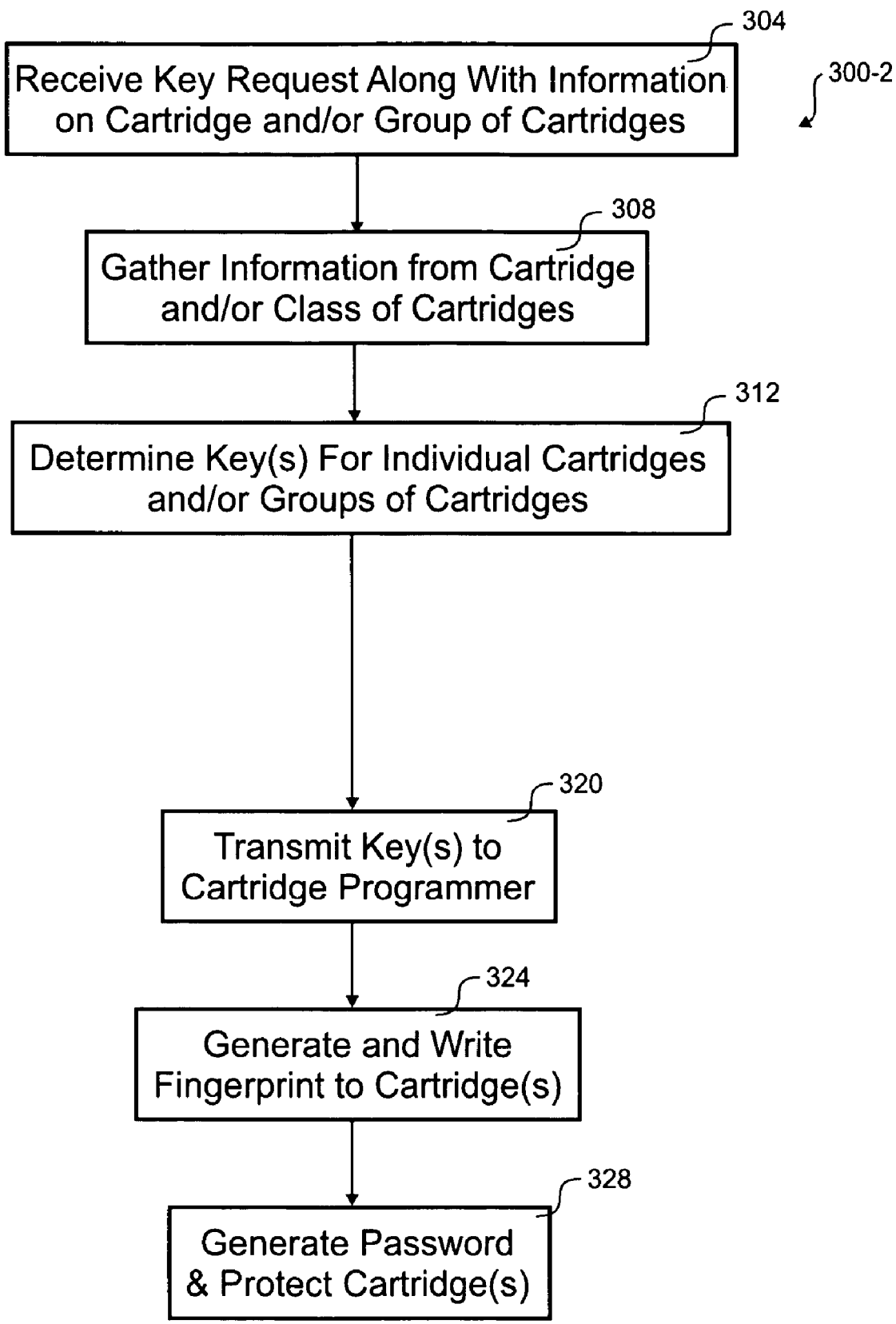

Referring next to FIG. 3B, a flow diagram of an embodiment of a process 300-2 for securing data cartridges 124 is shown. This embodiment uses a root key to generate a manufacturer key. The manufacturer key can be later derived from the root key and information from the data cartridge 124 such that storage of the manufacturer key is not necessary where the root key is available. This embodiment does not store the key at the authorizing system 128, but determines the key in step 312 as needed to generate a manufacturer key. This embodiment differs from the embodiment of FIG. 3A in that step 316 is skipped.

Figure 4A:
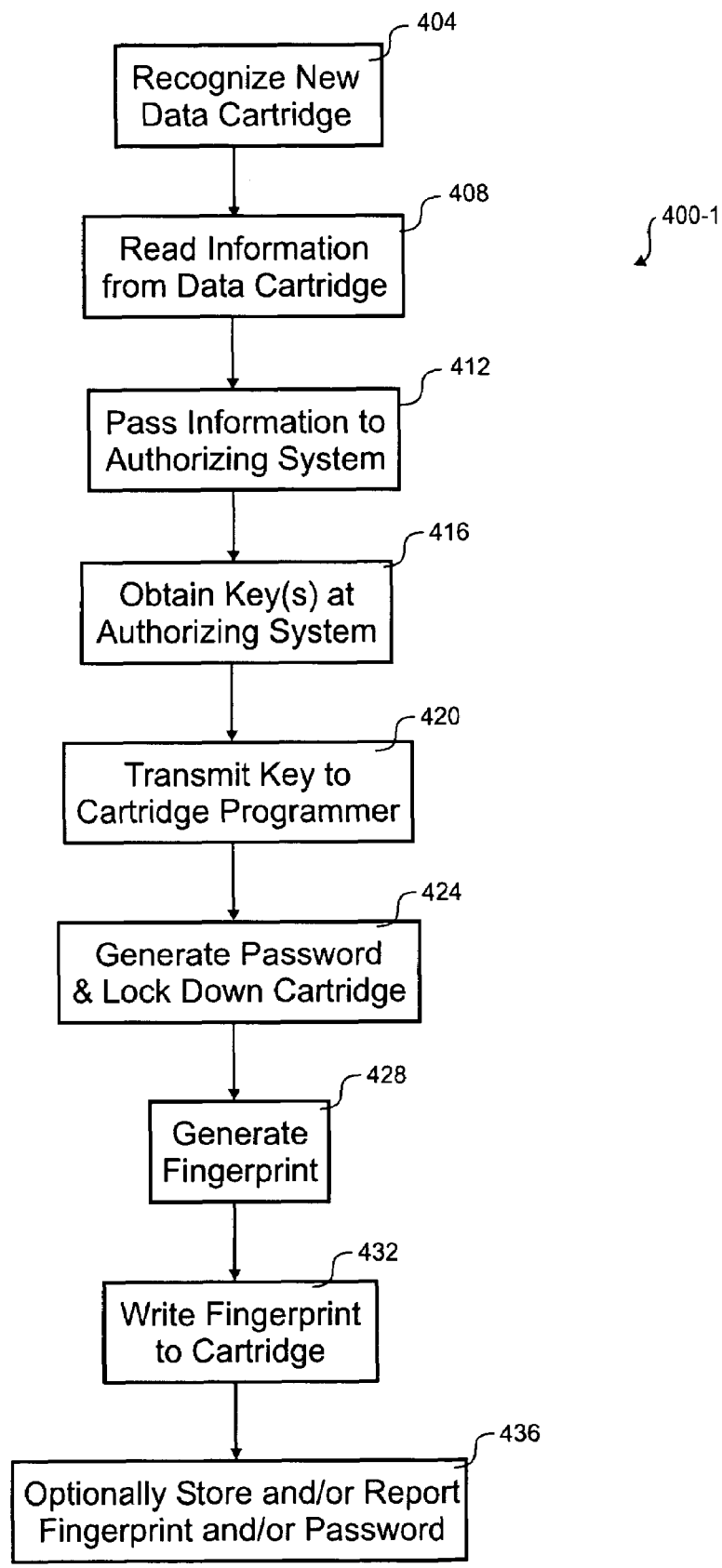
FIGS. 4A and 4B are flow diagrams of embodiments of a process for programming data cartridges for security.

With reference to FIG. 4A, a flow diagram of an embodiment of a process 400-1 for programming data cartridges 124 for security is shown. The programming of data cartridges 124 is performed by the cartridge programmer 132. Data cartridges 124 that are not properly programmed may not be usable by cartridge drives 204. The depicted portion of the process 400-1 begins in step 404 where a new data cartridge is recognized. Information is read from the data cartridge in step 408. This information is used to identify the data cartridge and generate or find the appropriate key used in generating the fingerprint and password.

Some or all the information gathered from the data cartridge 124 is passed to the authorizing system 128 in step. A key is obtained at the authorizing system in step 416. Some embodiments store keys at the cartridge drive such that requesting a key from the authorizing system is unnecessary in some cases. The key is transmitted from the authorizing system 128 to the drive programmer 204 in step 420.

In step 424, the cartridge drive 204 generates a password using the key and possibly other information gathered from the data cartridge 124. The data cartridge 124 has its password authentication feature activated to lock down the cartridge 124. The password can be entered to allow further reading/writing to the data cartridge 124.

In step 428, the fingerprint is generated based upon the key and possibly additional unique information from the data cartridge. This embodiment uses the same key for the password and fingerprint generation, but other embodiments could use different keys for each of these tasks. The generated fingerprint is written to the data cartridge in a predetermined location. The fingerprint may or may not be modifiable after the cartridge programmer 132 finishes, but modification of the fingerprint causes any subsequent authentication of the fingerprint to fail. Some embodiments store the fingerprint and/or password at the cartridge programmer 132 and/or the authorizing system 128.

Figure 4B:
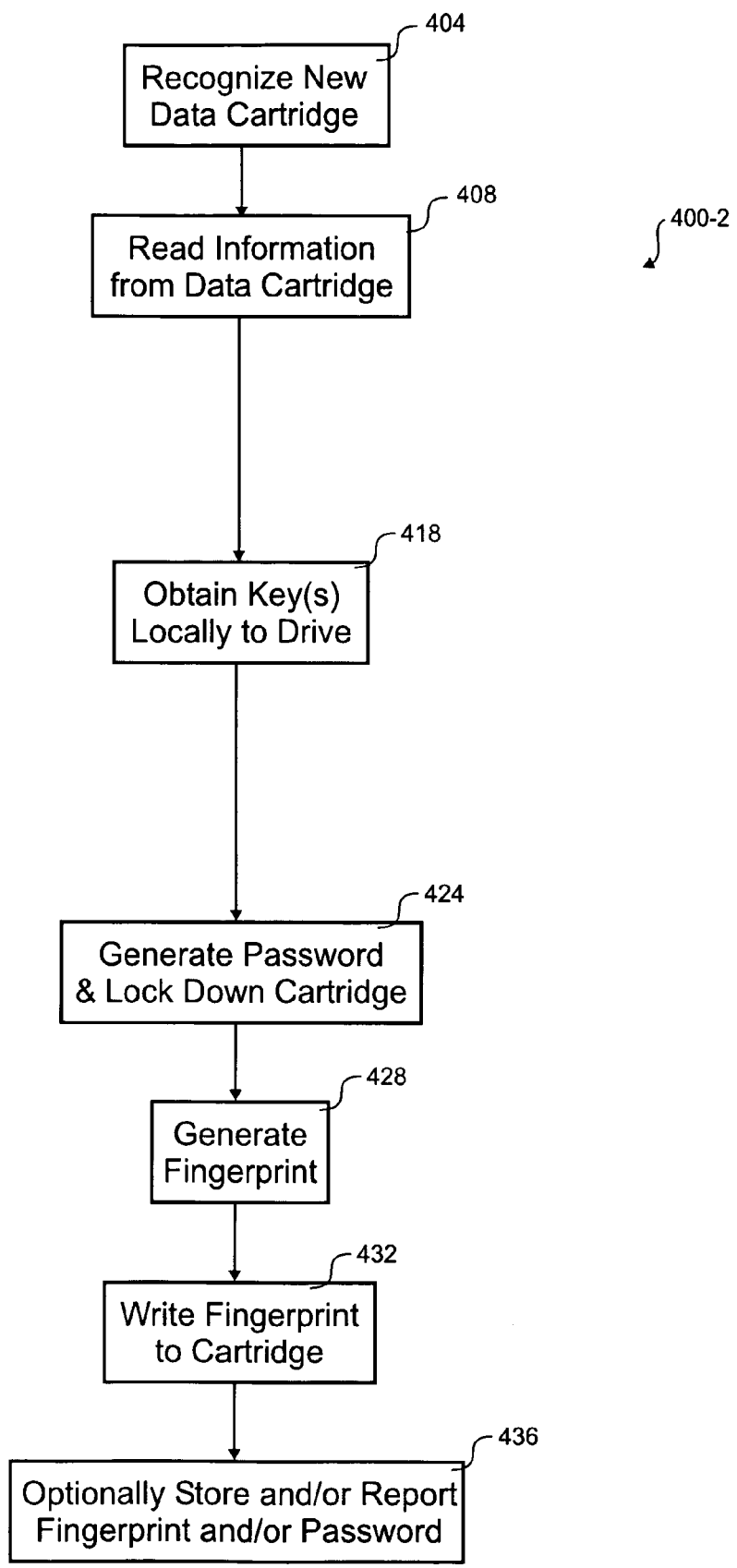

Referring next to FIG. 4B, a flow diagram of an embodiment of a process 400-2 for programming data cartridges 124 for security is shown. This embodiment can generate passwords and fingerprints without reference to the authorizing system 128-1. In comparison to the embodiment of FIG. 4A, steps 412, 416 and 420 are replaced with step 418. The key(s) are either stored or derivable locally in step 418. Where the key(s) are stored locally, information from the data cartridge 124 is used to find the appropriate key(s). In another embodiment, a root key is used with information from the data cartridge to determine the key(s).

Figure 5A:
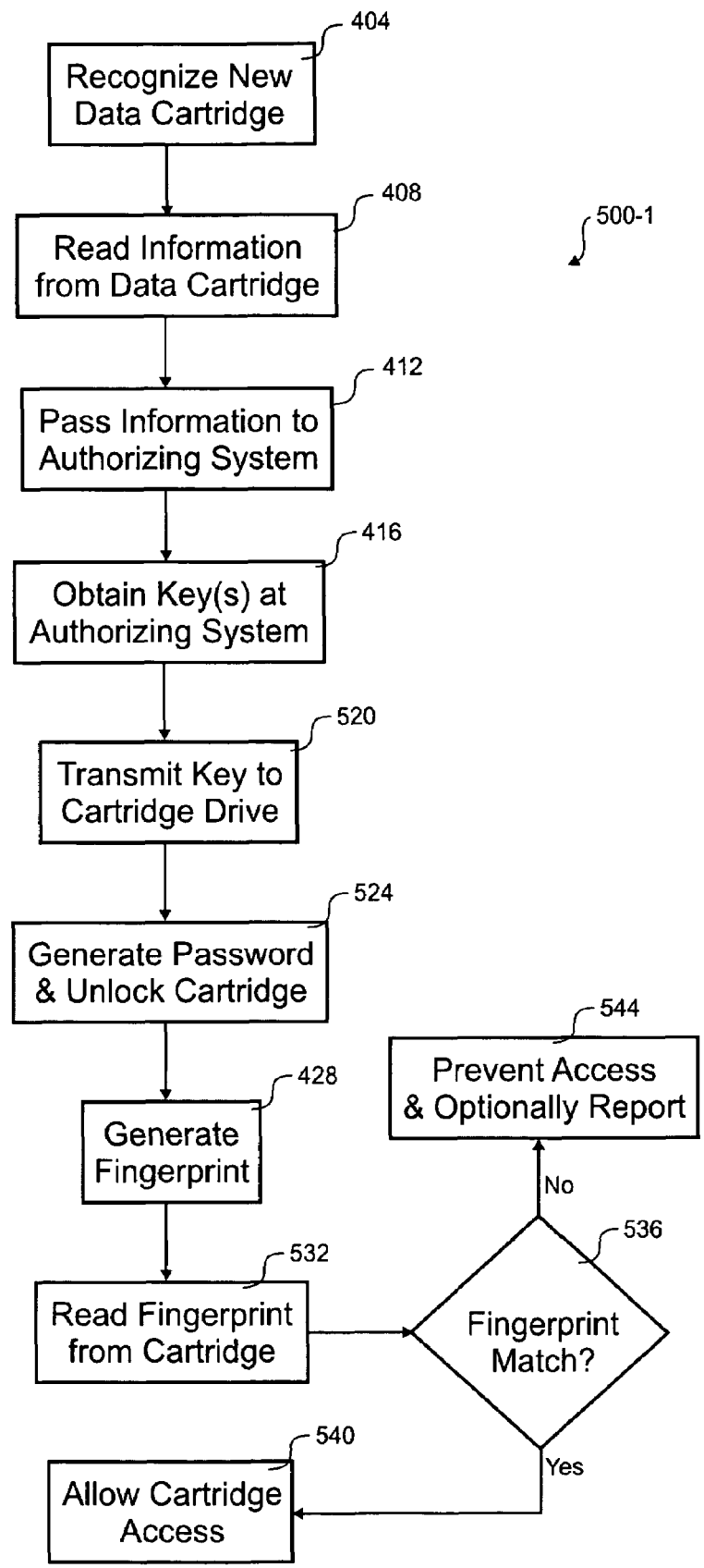
FIGS. 5A, 5B, 5C, and 5D are flow diagrams of embodiments of a process for unlocking data cartridges.

With reference to FIG. 5A, a flow diagram of an embodiment of a process 500-1 for unlocking data cartridges 124 is shown. Unlocking occurs before a cartridge drive 204 will use a data cartridge 124. Only data cartridges 124 properly initialized by the cartridge programmer 132 can be used. Additionally, a data cartridge 124 using a hard drive for storage cannot be used if it were removed from the data cartridge 124 because the password would be unknown. Some embodiments further encrypt the data on the cartridge 124 such that if authentication were thwarted, the data would be unintelligible.

The depicted portion of the process 500-1 begins in step 404 where a data cartridge is newly coupled to the cartridge drive 204. Steps 408, 412, and 416 are performed largely in the same way as the cartridge programmer 132 performed these steps in relation to FIG. 4A. The key for the particular data cartridge 124 is transmitted from the authorizing system 128 to the cartridge drive 204 in step 520. A cryptographically or physically secure channel can be used for this purpose. In step 524, the password is generated by the password generator 120 to unlock the data portion of the data cartridge 124.

The finger print is generated in step 428 before reading the fingerprint recorded on the data cartridge 124 in step 532. The generated and read fingerprints are compared in step 536. Where there is a match, the data portion of the data cartridge can be read and written to in step 540. Where there is no match, processing goes from step 536 to step 544 where access to the drive is prevented. Some embodiments further report the failure immediately to the authorizing system 128 or report it at a later time.

Figure 5B:
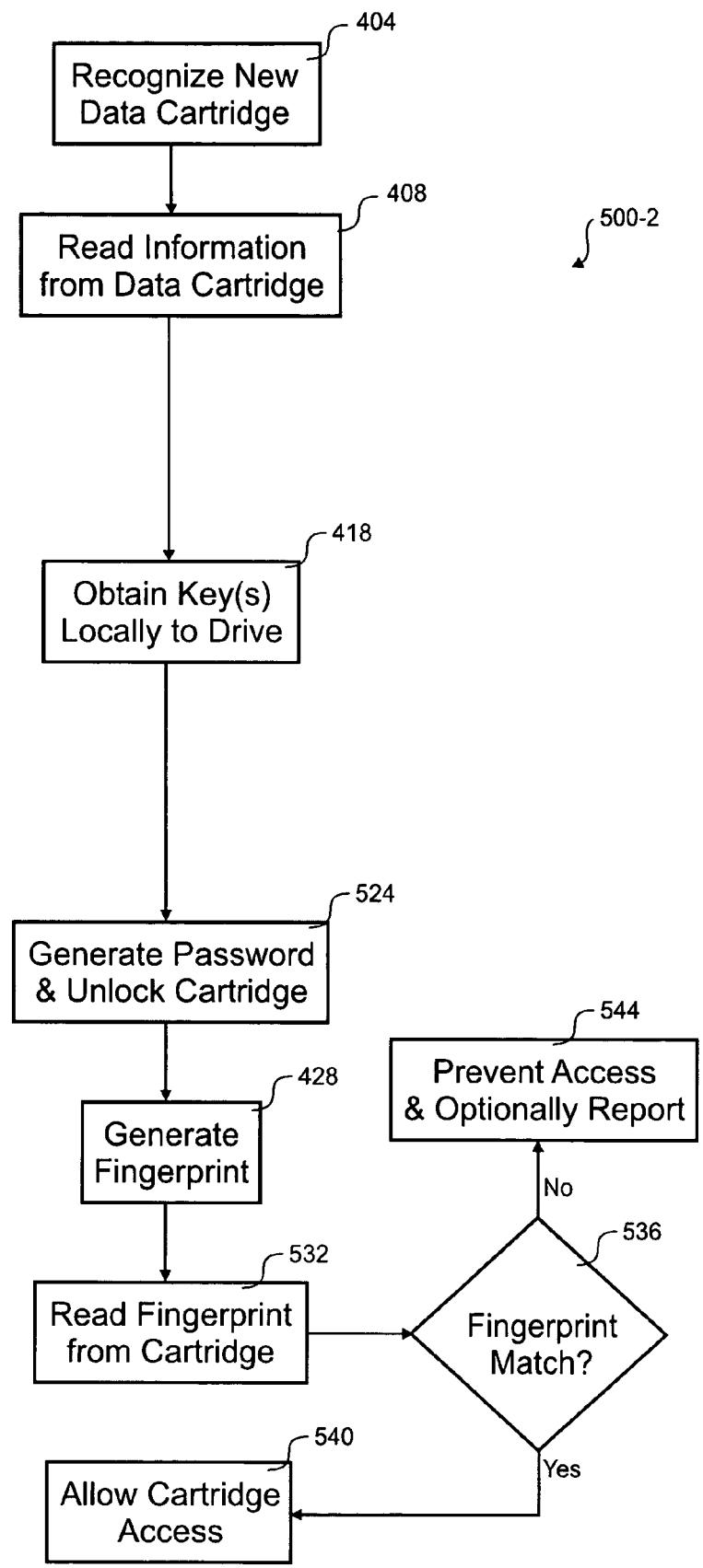

Referring next to FIG. 5B, a flow diagram of another embodiment of a process 500-2 for unlocking data cartridges 124 is shown. This embodiment differs from the embodiment of FIG. 5A in that steps 412, 416, and 420 are replaced with step 418. Instead of going to the authorizing system 128 for a key, this embodiment uses the cartridge drive 204-2 to generate keys locally in step 418. The locally-stored root key 104 is used with a seed determined from information retrieved from the data cartridge 124 to generate a key that is used to unlock the drive and verify the fingerprint.

Figure 5C:
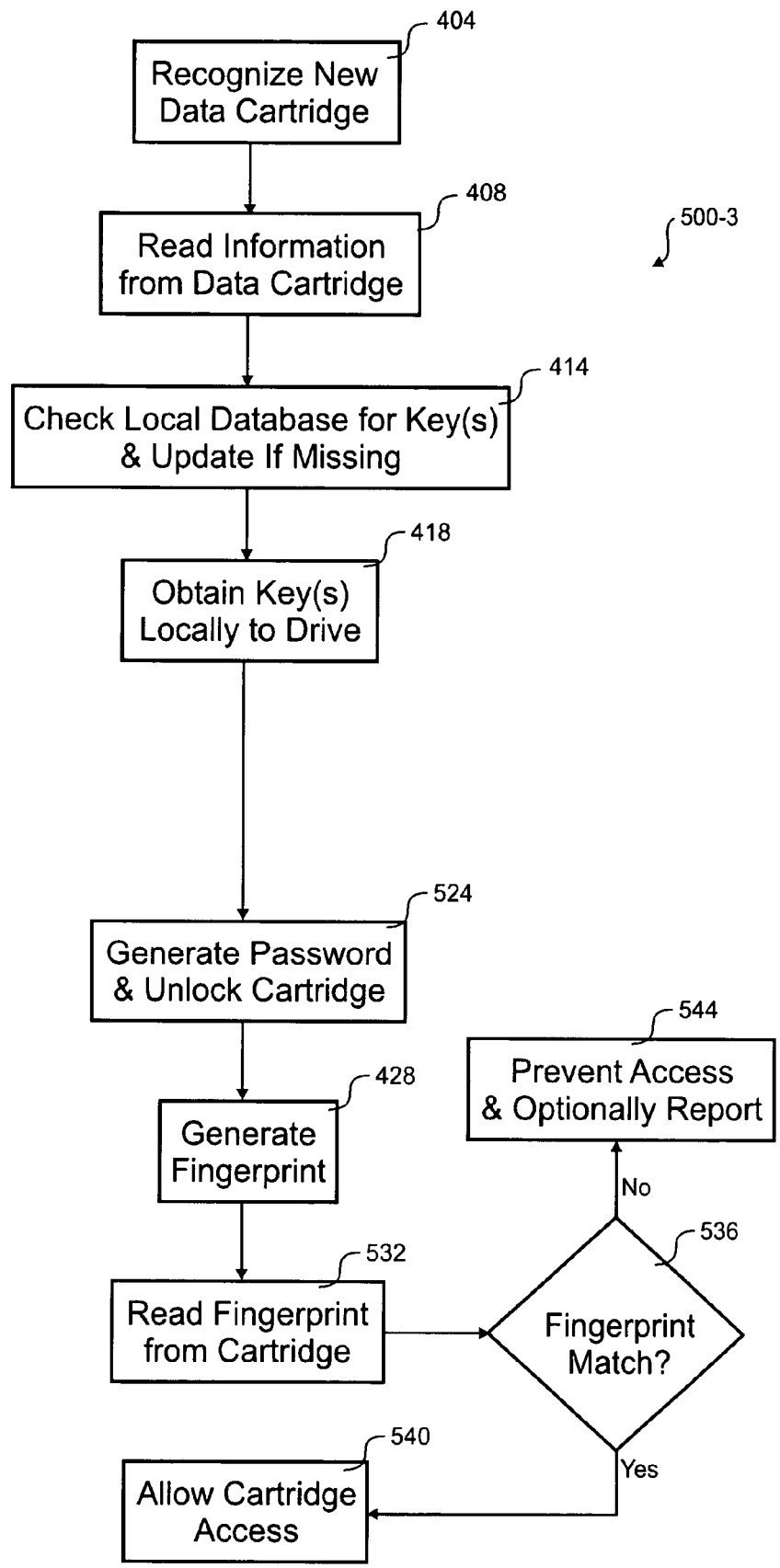

With reference to FIG. 5C, a flow diagram of still another embodiment of a process 500-3 for unlocking data cartridges 124 is shown. This embodiment replaces steps 412, 416, and 420 from the embodiment of FIG. 5A with steps 414 and 418. After reading information from the data cartridge 124 in step 408, a local key database is checked to determine if the key for the data cartridge is stored locally. Where it cannot be found locally, it can be requested. After obtaining the key and updating the local key database, the key is available locally in step 418 for use in unlocking the drive and verifying the fingerprint.

Figure 5D:
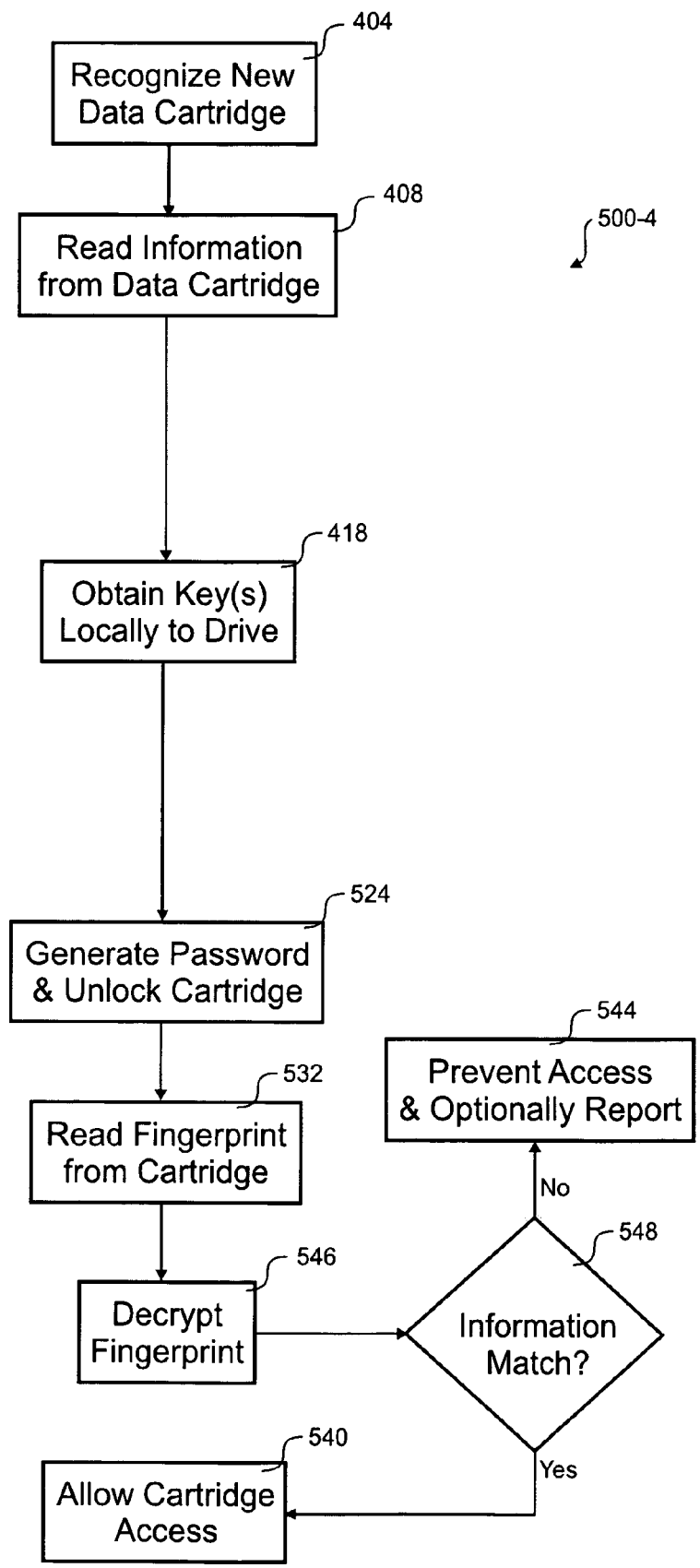

With reference to FIG. 5D, a flow diagram of yet another embodiment of a process 500-4 for unlocking data cartridges 124 is shown. This embodiment is largely the same as the embodiment of FIG. 5B until after step 524 where an encrypted fingerprint is read from the data cartridge 124. In this embodiment, the fingerprint is encrypted with a two-way algorithm such that after decryption in step 546, unique information is available in plain-text form. The unique information read from the data cartridge in step 400 is compared to that found by decrypting the fingerprint in step 548. Where there is a match, access is allow in step 540, whereas access is prevented in step 544 should there be no match.

A number of variations and modifications of the disclosed embodiments can also be used. For example, non-standard communication protocols to a data cartridge could be used in addition applications that use standard communications protocols. A particular optical disk cartridge, magnetic tape cartridge, etc. could have a proprietary communication protocol that could use the claimed principals regardless of communication protocol.

While the principles of the disclosure have been described above in connection with specific apparatuses and methods, it is to be clearly understood that this description is made only by way of example and not as limitation on the scope of the invention.

What is claimed is:

1. An authorization system for authorizing access to a data cartridge, the authorization system comprising:
   a code obtained from outside the data cartridge;
   a data cartridge interface used to read data from the data cartridge, wherein the data includes first information and a fingerprint;
   a fingerprint processor that generates second information using at least the code;
   a password generator that unlocks the data cartridge using the code and the data; and
   an authorizing engine coupled to at least one of the password generator or the fingerprint processor, wherein at least some of the data or the second information is compared to authorize the data cartridge.

2. The authorization system for authorizing access to the data cartridge as recited in claim 1, wherein the first information and the second information are compared to authorize the data cartridge.

3. The authorization system for authorizing access to the data cartridge as recited in claim 1, wherein:
   the second information includes a second fingerprint, and
   the fingerprint and the second fingerprint are compared to authorize the data cartridge.

4. The authorization system for authorizing access. to the data cartridge as recited in claim 1, further comprising a code generator that generates a second code from the code and first information, wherein the second code is used in generating a password with the password generator.

5. The authorization system for authorizing access to the data cartridge as recited in claim 1, further comprising a code generator that generates a second code from the code and first information, wherein the second code is used along with the second information in unlocking the data cartridge.

6. The authorization system for authorizing access to the data cartridge as recited in claim 1, wherein the data cartridge stores data encrypted, wherein the encryption algorithm is affected by the first information.

7. The authorization system for authorizing access to the data cartridge as recited in claim 1, wherein the code is used for generation of a key.

8. The authorization system for authorizing access to the data cartridge as recited in claim 1, wherein the code is a cryptographic key.

9. The authorization system for authorizing access to the data cartridge as recited in claim 8, wherein the key is a function of a root key.

10. The authorization system for authorizing access to the data cartridge as recited in claim 1, wherein:
    the first information comprises third information and second information,
    the third information is used by the fingerprint generator to generate a first fingerprint,
    the second information is used by the password generator to generate a password, and
    the third and second information are different.

11. The authorization system for authorizing access to the data cartridge as recited in claim 10, wherein the third information is accessible from the data cartridge before the password is provided to the data cartridge.

12. The authorization system for authorizing access to the data cartridge as recited in claim 10, wherein the first information includes at least one of: a defect list of the data cartridge, a model number of the data cartridge, a manufacturer identifier of the data cartridge, a RFID-read code of the data cartridge, or head optimization information of the data cartridge.

13. The authorization system for authorizing access to the data cartridge as recited in claim 1, wherein the data cartridge includes a hard disk drive.

14. The authorization system for authorizing access to the data cartridge as recited in claim 1, wherein a value of the code is affected by at least one of: an identifier unique to a particular data cartridge, a manufacturer of the data cartridge, or a model of the data cartridge.

15. The authorization system for authorizing access to the data cartridge as recited in claim 1, wherein:
the password generator unlocks the data cartridge by supplying a password to the data cartridge, and
the data cartridge holds a stored password and allows access to data storage portions of the data cartridge when the password corresponds to the stored password.

16. The authorization system for authorizing access to the data cartridge as recited in claim 1, wherein the data cartridge interface uses at least one of the following protocols for communication: SATA, PATA, SAS, SCSI, USB, Ethernet, BlueTooth, Zigbee, or WiFi.

17. The authorization system for authorizing access to the data cartridge as recited in claim 1, wherein the data cartridge interface is external to the data cartridge.

18. The authorization system for authorizing access to the data cartridge as recited in claim 1, wherein unlocking the data cartridge allows the fingerprint to be read by the data cartridge interface.

19. The authorization system for authorizing access to the data cartridge as recited in claim 1, wherein a data portion of the cartridge can be read and write accessed upon authorization of the data cartridge.

20. An authorization system for authorizing access to a data cartridge, the authorization system comprising:
a first code obtained from outside the data cartridge;
a data cartridge interface used to read first and second information and a second fingerprint from the data cartridge;
a fingerprint generator that generates a first fingerprint using at least the first code;
a password generator that generates a password to unlock the data cartridge using at least the second information; and
an authorizing engine coupled to at least one of the password generator or the fingerprint generator, wherein the first and second fingerprints are compared to authorize the data cartridge.

21. The authorization system for authorizing access to the data cartridge as recited in claim 20, further comprising a code generator that generates a second code from the first code and first information, wherein the second code is used in generating at least one of the first fingerprint or the password.

22. The authorization system for authorizing access to the data cartridge as recited in claim 20, wherein the first information is accessible from the data cartridge before the password is provided to the data cartridge.

23. The authorization system for authorizing access to the data cartridge as recited in claim 20, wherein the code is a function of a root key.

24. An authorization system for authorizing access to a data cartridge, the authorization system comprising:
a first code obtained from outside the data cartridge;
a data cartridge interface used to read first and second information and a fingerprint from the data cartridge;
a fingerprint decoder that generates third information from the fingerprint;
a password generator that unlocks the data cartridge using at least the second information; and
an authorizing engine coupled to at least one of the password generator or the fingerprint generator, wherein the second and third information are compared to authorize the data cartridge.

25. The authorization system for authorizing access to the data cartridge as recited in claim 24, a code generator that generates a second code from the first code and first information, wherein:
the second code is used to generate the third information, and
the second code is used along with the second information in unlocking the data cartridge.

26. A method for authorizing use of a data cartridge with a cartridge drive, the method comprising steps of:
reading first information from the data cartridge;
determining a password from at least one of the first information or a code, wherein the code is obtained from outside the data cartridge;
unlocking the data cartridge with the password;
reading an electronic fingerprint from the data cartridge;
generating second information from the electronic fingerprint;
comparing at least some of the first information and the second information; and
authorizing the data cartridge based, at least in part, on an outcome of the comparing step.

27. The method for authorizing use of the data cartridge with the cartridge drive as recited in claim 26, further comprising steps of:
determining a second electronic fingerprint from the information and the code, and
comparing the electronic fingerprint and the second electronic fingerprint to authorize the data cartridge.

28. The method for authorizing use of the data cartridge with the cartridge drive as recited in claim 26, wherein the code is a cryptographic key.

29. The method for authorizing use of the data cartridge with the cartridge drive as recited in claim 26, further comprising steps of:
programming the password into the data cartridge, whereby subsequent use requires password authentication;
writing the first electronic fingerprint to a logical location on the data cartridge.

30. The method for authorizing use of the data cartridge with the cartridge drive as recited in claim 26, further comprising a step of receiving the code from a remote location after reading the first information.

31. The method for authorizing use of the data cartridge with the cartridge drive as recited in claim 26, wherein the code is one of a plurality of codes stored in the cartridge drive before reading the first information.

32. The method for authorizing use of the data cartridge with the cartridge drive as recited in claim 26, wherein:
the information comprises first information and second information,
the first information is used in the first-listed determining step,
the second information is used in the second-listed determining step, and
the first and second information are different.

33. A computer-readable medium having computer-executable instructions for performing the computer-implementable method for authorizing use of the data cartridge with the cartridge drive of claim 26.

34. A computer system adapted to perform the computer-implementable method for authorizing use of the data cartridge with the cartridge drive of claim 26.

35. A method for authorizing a data cartridge for use with a cartridge drive, the method comprising steps of:
reading information from the data cartridge;

determining a password from the information and a code, wherein the code is obtained from outside the data cartridge;

programming the password into the data cartridge, whereby subsequent use requires password authentication;

determining a first electronic fingerprint from the information and the code; and writing the first electronic fingerprint to a logical location on the data cartridge, wherein subsequent use of the data cartridge with a cartridge drive requires providing the password and verifying the first electronic fingerprint.

36. The method for authorizing the data cartridge for use with the cartridge drive as recited in claim 35, wherein the logical location is affected by the information.

37. The method for authorizing the data cartridge for use with the cartridge drive as recited in claim 35, further comprising steps of:

unlocking the data cartridge with the password;

reading the first electronic fingerprint from the data cartridge;

determining a second electronic fingerprint from the information and the code;

comparing the first and second electronic fingerprints; and authorizing the data cartridge based, at least in part, on an outcome of the comparing step.

38. A computer-readable medium having computer-executable instructions for performing the computer-implementable method for authorizing the data cartridge for use with the cartridge drive of claim 35.

39. A computer system adapted to perform the computer-implementable method for authorizing the data cartridge for use with the cartridge drive of claim 35.

* * * * *